United States Patent
Zhang et al.

(10) Patent No.: US 12,502,781 B2
(45) Date of Patent: Dec. 23, 2025

(54) ROBOT OFFSET SIMULATION METHOD AND APPARATUS, ELECTRONIC DEVICE, AND STORAGE MEDIUM

(71) Applicant: CONTEMPORARY AMPEREX TECHNOLOGY (HONG KONG) LIMITED, Hong Kong (CN)

(72) Inventors: Dongfei Zhang, Ningde (CN); Xuming Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 260 days.

(21) Appl. No.: 18/363,009

(22) Filed: Aug. 1, 2023

(65) Prior Publication Data
US 2024/0017414 A1 Jan. 18, 2024

Related U.S. Application Data

(63) Continuation of application No. PCT/CN2023/084872, filed on Mar. 29, 2023.

(30) Foreign Application Priority Data

Apr. 19, 2022 (CN) .......................... 202210411285.2

(51) Int. Cl.
B25J 9/16 (2006.01)

(52) U.S. Cl.
CPC ............ B25J 9/1671 (2013.01); B25J 9/162 (2013.01); B25J 9/1658 (2013.01); B25J 9/1664 (2013.01); B25J 9/1692 (2013.01)

(58) Field of Classification Search
CPC ........ B25J 9/1671; B25J 9/162; B25J 9/1658; B25J 9/1664; B25J 9/1692; B25J 9/1687;
(Continued)

(56) References Cited

U.S. PATENT DOCUMENTS

| 2016/0089791 A1* | 3/2016 | Bradski ..................... G06T 7/13 |
| | | 700/214 |
| 2016/0332297 A1 | 11/2016 | Sugaya |

(Continued)

FOREIGN PATENT DOCUMENTS

| CN | 109318225 A | 2/2019 |
| CN | 110480615 A | 11/2019 |

(Continued)

OTHER PUBLICATIONS

Extended European search report for EP application No. 23744655.4 dated Jul. 18, 2024.

(Continued)

*Primary Examiner* — Adam R Mott
*Assistant Examiner* — Ricardo I Viscarra
(74) *Attorney, Agent, or Firm* — Ladas & Parry LLP

(57) ABSTRACT

Embodiments of the present application relate to the field of virtual simulation technologies, and provide a robot offset simulation method and apparatus, a robot, an electronic device, and a storage medium. The robot offset simulation method includes: establishing a reference path for a virtual robot in simulation software, where the reference path is a path along which the virtual robot moves to transfer a reference object from a preset starting point to a destination location and then returns to the preset starting point; receiving location information of a target object that is sent by a PLC; determining an offset of the virtual robot based on the location information, where the offset is a location offset of the target object relative to the reference object; and controlling, based on the reference path and the offset, the virtual robot to move to transfer the target object.

11 Claims, 3 Drawing Sheets

(58) Field of Classification Search
CPC ........... G05B 2219/40006; G05B 2219/40387; Y02P 90/02
See application file for complete search history.

(56) References Cited

U.S. PATENT DOCUMENTS

| | | | |
|---|---|---|---|
| 2021/0308865 A1* | 10/2021 | Lin | B25J 9/1651 |
| 2023/0236581 A1* | 7/2023 | van Eekelen | G06Q 10/06 |
| | | | 700/112 |
| 2023/0280759 A1* | 9/2023 | Kim | G06T 7/12 |
| | | | 701/28 |

FOREIGN PATENT DOCUMENTS

| | | |
|---|---|---|
| CN | 112777276 A | 5/2021 |
| CN | 115816436 A | 3/2023 |
| JP | H06143169 A | 5/1994 |

OTHER PUBLICATIONS

International Search Report for International Application PCT/CN2023/084872, mailed Jul. 6, 2023.
Written Opinion of International Search Authority for International Application PCT/CN2023/084872, mailed Jul. 6, 2023.

* cited by examiner

ROBOT OFFSET SIMULATION METHOD AND APPARATUS, ELECTRONIC DEVICE, AND STORAGE MEDIUM

CROSS-REFERENCE TO RELATED APPLICATIONS

This application is a continuation of International Patent Application No. PCT/CN2023/084872, filed on Mar. 29, 2023, which claims priority to Chinese Patent Application No. 202210411285.2, filed on Apr. 19, 2022. The aforementioned patent applications are incorporated herein by reference in their entirety.

TECHNICAL FIELD

Embodiments of the present application relate to the field of virtual simulation technologies, and in particular, to a robot offset simulation method and apparatus, a robot, an electronic device, and a storage medium.

BACKGROUND

At present, solution feasibility and logic optimization of robot products are usually verified in advance by using technologies such as virtual simulation. In virtual simulation technologies, means such as a robot offline program are applied to meet debugging needs. The robot offline program plays an important role in the field of intelligent manufacturing. After the robot offline program is imported into a controller of a real robot, the robot can complete a same work task as in a simulation environment by running the offline program.

However, currently, to implement that a robot grabs cells in different locations, a simulation engineer has to repeat the same work continuously, which causes the simulation engineer to do a lot of redundant and repetitive work and increases a debugging cycle.

SUMMARY

Implementations of the present application aim to provide a robot offset simulation method and apparatus, a robot, an electronic device, and a storage medium, such that a debugging cycle can be reduced while implementing robot offset simulation.

According to a first aspect, the present application provides a robot offset simulation method, including: establishing a reference path for a virtual robot in simulation software; where the reference path is a path along which the virtual robot moves to transfer a reference object from a preset starting point to a destination location and then returns to the preset starting point; receiving location information of a target object that is sent by a programmable logic controller (PLC); determining an offset of the virtual robot based on the location information; where the offset is a location offset of the target object relative to the reference object; and controlling, based on the reference path and the offset, the virtual robot to move to transfer the target object.

In the technical solution of the embodiments of the present application, by establishing the reference path of the virtual robot in the simulation software, when the virtual robot transfers the target object, the virtual robot can automatically shift on the basis of the reference path based on the location information of the target object, so as to transfer the target object without repeating the same work, for example, without repeatedly establishing multiple transfer paths. Therefore, the debugging cycle can be reduced.

In some embodiments, the location information of the target object includes: a layer number, a row number, and a column number of the target object; and the determining an offset of the virtual robot based on the location information includes: determining a row spacing and a column spacing between adjacent objects on a virtual pallet, and determining a layer spacing between adjacent stacked virtual pallets; and determining the offset of the virtual robot according to the layer number, the row number, the column number, the row spacing, the column spacing, and the layer spacing.

In the technical solution of the embodiments of the present application, considering that objects placed on the virtual pallet usually have the same row spacing, column spacing, and layer spacing, the layer number, the row number, and the column number of the target object are used as the location information of the target object. In combination with the layer number, the row number, the column number, the row spacing, the column spacing, and the layer spacing of the target object, the offset can be effectively and accurately obtained.

In some embodiments, the offset includes: an offset in the x-axis direction, an offset in the y-axis direction, and an offset in the z-axis direction; and the determining the offset of the virtual robot according to the layer number, the row number, the column number, the row spacing, the column spacing, and the layer spacing includes: calculating the offset in the x-axis direction according to the column number of the target object, the column number of the reference object, and the column spacing; calculating the offset in the y-axis direction according to the row number of the target object, the row number of the reference object, and the row spacing; and calculating the offset in the z-axis direction according to the layer number of the target object, the layer number of the reference object, and the layer spacing.

In the technical solution of the embodiments of the present application, the offsets in different directions can be accurately calculated to accurately implement the automatic shift of the virtual robot in different directions and implement the accurate transfer of the target object.

In some embodiments, the determining a row spacing and a column spacing between adjacent objects on a virtual pallet, and determining a layer spacing between adjacent stacked virtual pallets includes: receiving the row spacing and the column spacing between adjacent objects on the virtual pallet and the layer spacing between adjacent stacked virtual pallets that are input through a human-computer interaction interface.

In the technical solution of the embodiments of the present application, the row spacing, the column spacing, and the layer spacing can be determined simply, conveniently and directly through the human-computer interaction interface.

In some embodiments, the controlling, based on the reference path and the offset, the virtual robot to move, to transfer the target includes: controlling, based on the reference path, the virtual robot to move to a location of the reference object; and when the virtual robot moves to the location of the reference object, controlling the virtual robot to automatically shift by the offset to transfer the target object.

In the technical solution of the embodiments of the present application, the virtual robot can move to the location of the reference object under the guidance of the reference path, and automatically shift by the offset at the location of the reference object, to achieve accurate transfer of the target object.

In some embodiments, after the controlling, based on the reference path and the offset, the virtual robot to move, to transfer the target object, the method further includes: feeding back, to the PLC, a signal indicating that the transfer of the target object is completed; and receiving location information that is of a new target object and that is sent by the PLC, and continuing to control the virtual robot to move to transfer the new target object.

In the technical solution of the embodiments of the present application, the virtual robot can automatically and continuously transfer target objects at different locations.

In some embodiments, when the reference virtual pallet carrying the reference object includes an object that has not been transferred, the new target object is the object that has not been transferred; and when there is an empty virtual pallet that does not carry an object, the new target object is an object carried by a virtual pallet located below the empty virtual pallet.

In the technical solution of the embodiments of the present application, the virtual robot can automatically and continuously transfer target objects at different locations, and at the same time transfer target objects on each virtual pallet sequentially from top to bottom according to a stacking order of virtual pallets, so as to achieve orderly transfer of the target objects to shorten the time required to transfer all target objects.

In some embodiments, when there is an empty virtual pallet that does not carry an object, the method further includes: receiving a pallet transfer instruction sent by the PLC, and controlling the virtual robot to transfer the empty virtual pallet to a target location according to the pallet transfer instruction.

In the technical solution of the embodiments of the present application, by transferring the empty virtual pallet to the target location, after the empty virtual pallet is transferred, it is convenient for the virtual robot to directly transfer the objects carried by the virtual pallet below the empty virtual pallet.

In some embodiments, before the establishing a reference path for a virtual robot in simulation software, the method further includes: importing an extensible markup language (XML) file in the simulation software; where a robot automatic offset offline program is integrated in the XML file.

In the technical solution of the embodiments of the present application, by importing the XML file integrated with the robot automatic offset offline program into the simulation software, it is convenient to automatically and accurately implement the subsequent simulation of the robot offset.

In some embodiments, after the controlling, based on the reference path and the offset, the virtual robot to move, to transfer the target object, the method further includes: determining whether the virtual robot has successfully transferred N target objects, where N is a natural number greater than 1; in a case that the virtual robot has successfully transferred N target objects, determining that the robot automatic offset offline program has passed verification, and exporting the verified robot automatic offset offline program; and importing the verified robot automatic offset offline program into a real robot.

In the technical solution of the embodiments of the present application, through the verification of the robot automatic offset offline program, the verified robot automatic offset offline program is imported into the real robot, so that the real robot can directly perform cell transfer in a real scenario based on the verified robot automatic offset offline program, that is, the robot automatic offset offline program exported in the embodiments of the present application can be directly used on site.

According to a second aspect, the present application provides a robot, where the above-mentioned verified robot automatic offset offline program is imported into the robot.

According to a third aspect, the present application provides a robot offset simulation apparatus, including: an establishing module, configured to establish a reference path for a virtual robot in simulation software; where the reference path is a path along which the virtual robot moves to transfer a reference object from a preset starting point to a destination location and then returns to the preset starting point; a receiving module, configured to receive location information of a target object that is sent by a PLC; a determining module, configured to determine an offset of the virtual robot based on the location information; where the offset is a location offset of the target object relative to the reference object; and a control module, configured to control, based on the reference path and the offset, the virtual robot to move, to transfer the target object.

According to a fourth aspect, the present application provides an electronic device, including: at least one processor; and a memory communicatively coupled to the at least one processor; where the memory stores instructions executable by the at least one processor, and when executed by the at least one processor, the instructions cause the at least one processor to perform the robot offset simulation method according to the first aspect.

According to a fifth aspect, the present application provides a computer-readable storage medium storing a computer program, and when the computer program is executed by a processor, the robot offset simulation method according to the first aspect is implemented.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

Various other advantages and benefits will become apparent to those of ordinary skill in the art upon reading the following detailed description of preferred implementations. Accompanying drawings are merely for the purpose of illustrating the preferred implementations and are not to be construed as limiting the present application. Moreover, like components are denoted by like reference numerals throughout the accompanying drawings. In the drawings.

DETAILED DESCRIPTION

Figure 1:
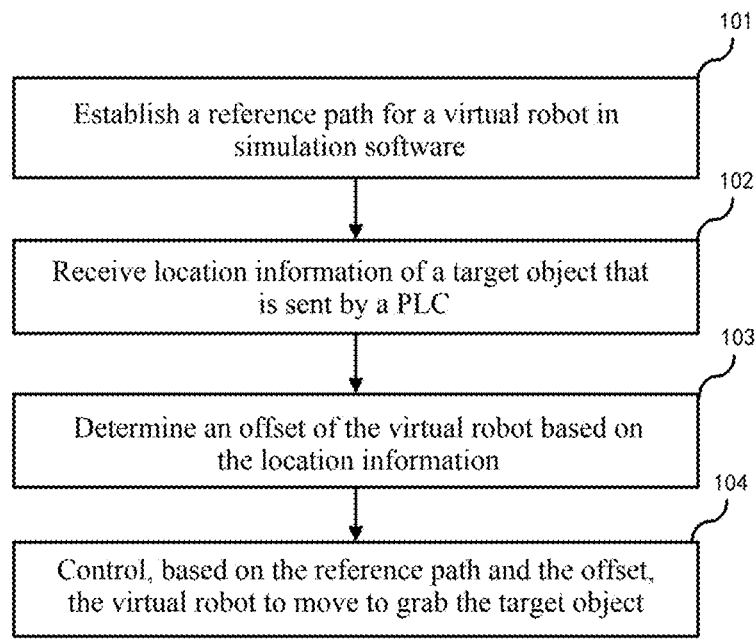
FIG. 1 is a flowchart of a robot offset simulation method according to an embodiment of the present application.

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or location relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential", etc. are based on the orientation or location relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

At present, lithium batteries are mainly used as power in electric vehicles. Lithium batteries have the characteristics such as a high capacity, a high output voltage, and good charge and discharge cycling performance. In a production process of lithium batteries, industrial robots need to be used to carry cells, modules, and other products. On a cell pallet, there are usually multiple cells that need to be grabbed and placed repeatedly by industrial robots. Industrial robots often grab and place products in multiple locations through automatic point coordinate shift.

It is noticed that at this stage, the feasibility and logic optimization of grabbing and placing cells by a robot are verified in advance through virtual simulation. A robot offline program is a robot motion path planned and designed by a simulation engineer in a simulation environment. After the robot offline program is imported into a controller of a real robot, the robot can complete a same work task as in a simulation environment by running the offline program. However, a robot palletizing program currently supported in Tecnomatix Process Simulate cannot implement the function of automatic point shift. To implement that a robot grabs cells in different locations, a simulation engineer has to repeat the same work continuously. For example, every time the robot needs to grab a cell in a location, the simulation engineer needs to establish a grabbing path to grab a cell in this location. As a result, the simulation engineer needs to repeatedly establish multiple robot grabbing paths and set signal conditions to grab cells in different locations. This causes the simulation engineer to do a lot of redundant and repetitive work and increases a debugging cycle.

To prevent the simulation engineer from doing a lot of redundant and repetitive work and reduce the debugging cycle, the applicant found through research that a reference path may be established, such that when grabbing a target object, the virtual robot can automatically shift on the basis of the reference path based on the location information of the target object to be grabbed, to grab the target object without repeatedly establishing multiple grabbing paths, so as to reduce the debugging cycle.

A robot offset simulation method according to an embodiment of the present application is applied to an electronic device, simulation software may be installed on the electronic device, and the simulation software may be Tecnomatix Process Simulate. For example, the electronic device may be a computer running Tecnomatix Process Simulate, and the robot offset can be simulated through the simulation software. In a real scenario: the robot may be an industrial robot used to transfer target objects, and the target objects may be physical products that need to be transferred, such as cells and batteries. In a simulation scenario: the robot may be a virtual robot, and the target object may be virtual products that need to be transferred, such as virtual cells and virtual batteries. The embodiments of the present application are mainly to implement the transfer of the target object by the virtual robot in the simulation scenario, so as to facilitate subsequent verification of whether the transfer logic of the virtual robot for the target object is proper and accurate and can be applied to the real scenario. The transfer of the target object by the robot can be understood as a process in which the robot transfers the target object from the current location of the target object to a destination location. Specifically, the robot may grab the target object from the current location and place it at the destination location to implement the transfer of the target object. Alternatively, the robot may attract the target object through attraction force to transfer the target from the current location to the destination location. However, in this embodiment, a specific implementation of transferring the target object by the robot is not limited.

According to some embodiments of the present application, the robot offset simulation method is applied to an electronic device installed with simulation software. A flowchart of the simulation method can be shown in FIG. 1 and includes:

Step 101: establishing a reference path for a virtual robot in simulation software, where the reference path is a path along which the virtual robot moves to transfer a reference object from a preset starting point to a destination location and then returns to the preset starting point;

step 102: receiving location information of a target object that is sent by a PLC;

step 103: determining an offset of the virtual robot based on the location information, where the offset is a location offset of the target object relative to the reference object; and step 104: controlling, based on the reference path and the offset, the virtual robot to move to grab the target object.

Figure 2:
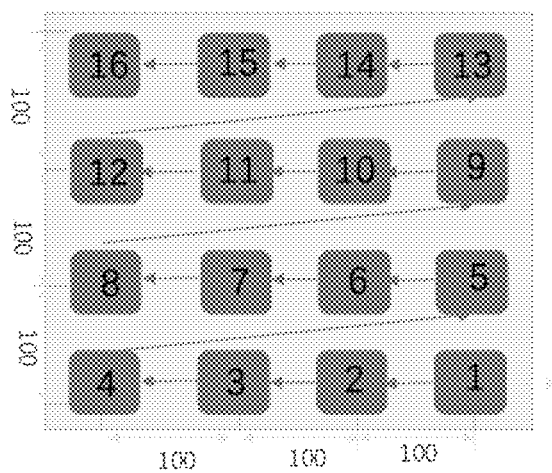
FIG. 2 is a schematic diagram of several virtual cells placed on a virtual pallet according to an embodiment of the present application.

In step 101, the reference object can be a virtual product that needs to be transferred by the virtual robot, such as a reference virtual cell or a reference virtual battery, and the transfer herein can be implemented by the above-mentioned grabbing or gravitational attraction. The reference object can be one of several objects to be transferred. In the following description, for example, several objects to be transferred are virtual cells:

Usually, several virtual cells to be transferred are placed on a virtual pallet, and several virtual cells can be placed in an orderly manner on a virtual pallet. Refer to FIG. 2. FIG. 2 is a schematic diagram of several virtual cells placed on a virtual pallet. Each virtual cell can be marked with a different number. In FIG. 2, 4 rows×4 columns=16 cells are placed on a virtual pallet. In a specific implementation, several virtual pallets on which virtual cells are placed can be stacked to form a stack of virtual cells, that is, multi-layer virtual cells. The reference virtual cell may be a virtual cell placed on the top virtual pallet in a stack of virtual cells. Assuming that the virtual cells placed on the top virtual pallet are shown in FIG. 2, the virtual cells at the corners of the virtual pallet can be selected as the reference virtual cells, for example, the virtual cells marked with 1, 4, 13, or 16 can be selected as a reference virtual cell, so that the virtual robot can subsequently automatically shift, in the location of the reference virtual cell, to the location of another virtual cell in an orderly manner to implement the transfer of another virtual cell.

The preset starting point may be a starting location in which the virtual robot prepares to transfer each time, for example, grabs the virtual cell, and the destination location may be a destination location to which the virtual cell finally needs to be grabbed. The preset starting point and the destination location may be set according to actual needs, and the preset starting point and the destination location may be a same location or different locations. This is not specifically limited in this embodiment.

In some embodiments, the virtual robot and the virtual cell that need to be transferred by the virtual robot can be pre-created in the simulation interface of the simulation software, and the virtual robot and the virtual cell in the simulation interface can be a 3D model of the robot and a 3D model of the cell. The electronic device can select the reference virtual cell as the reference object from the virtual cells that need to be transferred by the virtual robot in the simulation interface, determine a destination location to which the reference object is transferred, use the location of the virtual robot in the simulation interface as the preset starting point, and establish the reference path of the virtual robot according to the preset starting point, the location of the reference object in the simulation interface, and the destination location, so that the virtual robot subsequently can complete the transfer of the reference virtual cell along the reference path.

In step 102, the target object may be an object to be transferred by the virtual robot for this time, that is, one of several objects to be transferred. For example, the target object may be a reference object, or may be an object other than the reference object among the several objects to be transferred. The location information of the target object may be a location of the target object on the virtual pallet. After the PLC determines the target object to be transferred by the virtual robot for this time, the PLC can send the location information of the target object to the electronic device. The PLC sends the location information of the target object to the electronic device, which can also be: the PLC sends the location information of the target object to the virtual robot in the simulation software of the electronic device.

In step 103, the electronic device may determine a location offset of the target object relative to the reference object based on the location information of the target object and the location information of the reference object, and use the location offset as the offset of the virtual robot. It may be understood that: when the target object is the reference object, the determined location offset is 0, that is, the virtual robot can complete the transfer of the target object directly according to the reference path without automatically shifting on the basis of the reference path. When the target object is an object other than the reference object, the determined location offset may include: a horizontal offset (such as an offset in the x-axis direction), a vertical offset (such as an offset in the y-axis direction), and an offset in the height direction (such as an offset in the z-axis direction) between the target object and the reference object.

In some embodiments, referring to FIG. 2, assuming that the reference object is a virtual cell marked with number 1 (referred to as virtual cell 1 for short), and the target object is a virtual cell marked with number 2 (referred to as virtual cell 2 for short), the determined offset for the virtual robot includes: the horizontal offset is 100, the vertical offset is 0, and the offset in the height direction is 0. It can be understood that when the reference object and the target object are a same object, the determined horizontal offset, vertical offset, and offset in the height direction are all 0.

In step 104, the virtual robot can move to the location of the target object under the guidance of the reference path and the offset, so as to implement the transfer of the target object.

In some embodiments, the number of target objects that the virtual robot grabs each time can be set according to actual needs. The virtual robot can grab one target object each time, or grab multiple target objects each time. This is not specifically limited in this embodiment. For example, if the target object is a virtual cell, the virtual robot can grab one virtual cell or multiple virtual cells each time, but generally all the virtual cells in the virtual pallet need to be grabbed for multiple times.

In this embodiment, by establishing the reference path of the virtual robot in the simulation software, when the virtual robot transfers the target object, the virtual robot can automatically shift on the basis of the reference path based on the location information of the target object, so as to transfer the target object without repeating the same work, for example, without repeatedly establishing multiple transfer paths. Therefore, the debugging cycle can be reduced. When the virtual robot implements the transfer of the target object through the action of grabbing, the transfer path can also be understood as a grabbing path.

Figure 3:
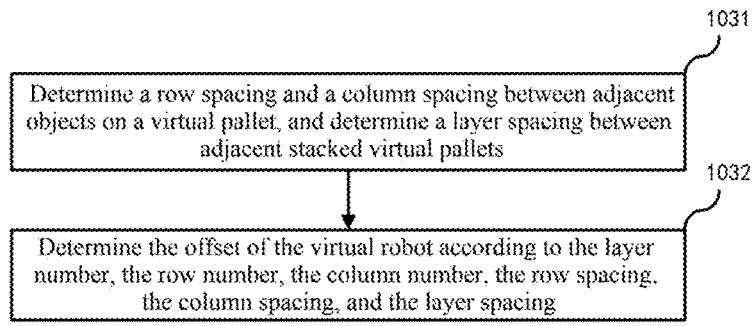
FIG. 3 is a schematic diagram of an implementation process of step 103 according to an embodiment of the present application.

According to some embodiments of the present application, optionally, the location information of the target object includes: a layer number, a row number, and a column number of the target object. An implementation process of step 103 can be shown in FIG. 3 and includes:

Step 1031: Determine a row spacing and a column spacing between adjacent objects on a virtual pallet, and determine a layer spacing between adjacent stacked virtual pallets.

Step 1032: Determine the offset of the virtual robot according to the layer number, the row number, the column number, the row spacing, the column spacing, and the layer spacing.

In this embodiment, virtual cells on a same virtual pallet have corresponding row numbers and column numbers according to rows and columns of the virtual cells on the virtual pallet, and virtual cells on the same virtual pallet have a same layer number. For example, referring to FIG. 2, the layer number of all virtual cells on the virtual pallet in FIG. 2 may be 1. According to different settings of a start row and a start column, a virtual cell marked with 16 in FIG. 2 can be used as a virtual cell located on the starting row and the starting column, or a virtual cell marked with 1 in FIG. 2 can be used as a virtual cell located on the starting row and the starting column. This is not specifically limited in this embodiment.

In step 1031, the row spacing and the column spacing between two adjacent objects can be respectively: a horizontal spacing and a vertical spacing between the two adjacent objects. The horizontal spacing is a spacing in the x-axis direction, and the vertical spacing is a spacing in the y-axis direction. The layer spacing between adjacent stacked virtual pallets is a spacing between two adjacent stacked virtual pallets in the height direction, that is, the spacing in the z-axis direction.

In some embodiments, referring to FIG. 2, FIG. 2 is a schematic diagram of several virtual cells placed on a virtual pallet. It can be seen from FIG. 2 that the row spacing and the column spacing between adjacent virtual cells are both 100.

In some embodiments, the row spacing and the column spacing between adjacent objects on the virtual pallet, and the layer spacing between adjacent stacked virtual pallets can be recognized through a visual recognition technology.

In step 1032, the location offset of the target object relative to the reference object can be calculated according to the layer number, the row number, and the column number of the target object, and the row spacing, the column spacing, and the layer spacing determined in step 1031, and the calculated location offset is used as the offset of the virtual robot.

In some embodiments, the location offset of the target object relative to the reference object includes: a horizontal offset, that is, an offset in the x-axis direction, a vertical offset, that is, an offset in the y-axis direction, and an offset in the height direction, that is, an offset in the z-axis direction. According to the layer number, the row number, the column number, the row spacing, the column spacing, and the layer spacing of the target object, the offset of the target object in the x-axis direction, the offset of the target object in the y-axis direction, and the offset of the target object in the z-axis direction relative to the reference object can be calculated respectively.

In this embodiment, considering that objects placed on the virtual pallet usually have the same row spacing, column spacing, and layer spacing, the layer number, the row number, and the column number of the target object are used as the location information of the target object. In combination with the layer number, the row number, the column number, the row spacing, the column spacing, and the layer spacing of the target object, the offset can be effectively and accurately obtained.

According to some embodiments of the present application, optionally, the offset includes: an offset in the x-axis direction, an offset in the y-axis direction, and an offset in the z-axis direction. The determining the offset of the virtual robot according to the layer number, the row number, the column number, the row spacing, the column spacing, and the layer spacing in step 1032 includes: calculating the offset in the x-axis direction according to the column number of the target object, the column number of the reference object, and the column spacing; calculating the offset in the y-axis direction according to the row number of the target object, the row number of the reference object, and the row spacing; and calculating the offset in the z-axis direction according to the layer number of the target object, the layer number of the reference object, and the layer spacing.

The following describes calculation manners of the offsets in different directions:

The offset in the z-axis direction may be calculated according to the layer number of the target object, the layer number of the reference object, and the layer spacing. For example, the number of the layer where the reference object is located can be subtracted from the number of the layer where the target object is located, and then a subtraction result is multiplied by the layer spacing, to obtain the offset in the z-axis direction. For example, when the number of the layer where the target object is located is the same as the number of the layer where the reference object is located, the offset in the z-axis direction is 0. When the number of the layer where the target object is located is 2, and the number of the layer where the reference object is located is 1, the offset in the z-axis direction is 1*layer spacing. That is, when the number of the layer where the target object is located is n and the number of the layer where the reference object is located is 1, the offset in the z-axis direction is (n−1)*layer spacing.

The offset may be calculated in the x-axis direction according to the column number of the target object, the column number of the reference object, and the column spacing. The offset in the x-axis direction is: an absolute value of a difference between the number of the column where the target object is located and the number of the column where the reference object is located is multiplied by a column spacing. For example, the row number and the column number of the target object are respectively: 1 and 4, the row number and the column number of the reference object are respectively: 1 and 1, and then it is determined that the offset in the x-axis direction is: (4-1)*column spacing.

The offset in the y-axis direction is calculated according to the row number of the target object, the row number of the reference object, and the row spacing. The offset in the y-axis direction is: an absolute value of a difference between the number of the row where the target object is located and the number of the row where the reference object is located is multiplied by a row spacing. For example, the row number and the column number of the target object are respectively: 3 and 1, the row number and the column number of the reference object are respectively: 1 and 1, and then it is determined that the offset in the y-axis direction is: (3-1)*row spacing.

In some embodiments, calculating the offsets in the directions of the x and y axes can be divided into the following cases:

When the number of the row where the target object is located is the same as the number of the row where the reference object is located, the offset in the y-axis direction is determined as 0, and the offset in the x-axis direction is determined as: a difference between the number of the column where the target object is located and the number of the column where the reference object is located is multiplied by a column spacing. For example, the row number and the column number of the target object are respectively: 1 and 4, the row number and the column number of the reference object are respectively: 1 and 1, the offset in the y-axis direction is determined as 0, and the offset in the x-axis direction is determined as: (4-1)*column spacing.

When the number of the column where the target object is located is the same as the number of the column where the reference object is located, the offset in the x-axis direction is determined as 0, and the offset in the y-axis direction is determined as: a difference between the number of the row where the target object is located and the number of the row where the reference object is located is multiplied by a row spacing. For example, the row number and the column number of the target object are respectively: 3 and 1, the row number and the column number of the reference object are respectively: 1 and 1, the offset in the x-axis direction is determined to be 0, and the offset in the y-axis direction is determined to be: (3-1)*row spacing.

When the row number and the column number of the target object are different from the row number and the column number of the reference object, the offset in the x-axis direction is determined as: an absolute value of a difference between the number of the column where the target object is located and the number of the column where the reference object is located is multiplied by a column spacing. The offset in the y-axis direction is determined as: an absolute value of a difference between the number of the row where the target object is located and the number of the row where the reference object is located is multiplied by a row spacing.

In this embodiment, the offsets in different directions can be accurately calculated to accurately implement the automatic shift of the virtual robot in different directions and implement the accurate transfer of the target object.

According to some embodiments of the present application, optionally, the determining a row spacing and a column spacing between adjacent objects on a virtual pallet, and determining a layer spacing between adjacent stacked virtual pallets in step 1031 includes: receiving the row spacing and the column spacing between adjacent objects on the virtual pallet and the layer spacing between adjacent stacked virtual pallets that are input through a human-computer interaction interface.

The human-computer interaction interface may be a display interface of an electronic device installed with simulation software, or may be a display interface of other devices. Relevant personnel can input the row spacing and the column spacing between adjacent objects on the virtual pallet and the layer spacing between stacked adjacent virtual pallets on the human-computer interaction interface.

In this embodiment, the row spacing, the column spacing, and the layer spacing can be determined simply, conveniently and directly through the human-computer interaction interface.

According to some embodiments of the present application, optionally, the controlling, based on the reference path and the offset, the virtual robot to move, to transfer the target object, the method further in step 104 includes: controlling, based on the reference path, the virtual robot to move to a location of the reference object; and when the virtual robot moves to the location of the reference object, controlling the virtual robot to automatically shift by the offset to transfer the target object.

Referring to FIG. 2, it is assumed that the reference object is a virtual cell marked with 1 (the row number and the column number are both 1), and the target object is a virtual cell marked with 9 (the row number and the column number are 3 and 1 respectively). In this case, the virtual robot may be controlled to move along the reference path to the location of the virtual cell marked with 1, and then the virtual robot may be controlled to shift by 0 in the x-axis direction, shift by 0 in the z-axis direction, and shift by (3-1)*row spacing=2*100 in the y-axis direction, to reach the location of the virtual cell marked with 9, so as to grab the virtual cell marked with 9 to the destination location to implement the transfer of the virtual cell.

In this embodiment, the virtual robot can move to the location of the reference object under the guidance of the reference path, and automatically shift by the offset at the location of the reference object, to achieve accurate transfer of the target object.

According to some embodiments of the present application, optionally, after the controlling, based on the reference path and the offset, the virtual robot to move, to transfer the target object in step 104, the method further includes: feeding back, to the PLC, a signal indicating that the transfer of the target object is completed; and receiving location information that is of a new target object and that is sent by the PLC, and continuing to control the virtual robot to move to transfer the new target object.

That is, each time the virtual robot completes the transfer of the target object, the electronic device sends, to the PLC, a signal indicating that the transfer of the target object is completed. When the PLC receives the signal, the PLC sends the location information of the new target object to the electronic device. The electronic device can continue to control, according to the received location information of the new target object, the virtual robot to move to transfer the new target object. The new target object can be: one of objects that have not been transferred by the virtual robot. The location information of the new target object may include: a layer number, a row number, and a column number of the new target object.

In this embodiment, the virtual robot can automatically and continuously transfer target objects in different locations.

According to some embodiments of the present application, optionally, when the reference virtual pallet carrying the reference object includes an object that has not been transferred, the new target object is the object that has not been transferred; and when there is an empty virtual pallet that does not carry an object, the new target object is an object carried by a virtual pallet located below the empty virtual pallet.

For example, referring to FIG. 2, it is assumed that the virtual pallet in FIG. 2 is the reference virtual pallet, and the reference object is a virtual cell marked with 1. If there are virtual cells that have not been transferred on the reference virtual pallet, the virtual cells that have not been transferred on the reference virtual pallet are used as new target objects, so as to preferentially complete the transfer of the virtual cells on the reference virtual pallet. If the reference virtual pallet does not include a virtual cell that has not been transferred and becomes an empty virtual pallet, a new target object can be selected from objects carried by a virtual pallet below the empty virtual pallet.

In some embodiments, if a virtual cell that has just been transferred has an adjacent virtual cell, the adjacent virtual cell may be used as a new target object. For example, referring to FIG. 2, if the virtual cell that has just been transferred is the virtual cell marked with 1, the virtual cell marked with 2 can be used as a new target object. If there is no virtual cell on a row where the virtual cell that has just been transferred is located, a virtual cell may be selected, as a new target object, on an adjacent row of the row where the virtual cell that has just been transferred is located. For example, referring to FIG. 2, if the virtual cell that has just been transferred is a virtual cell marked with 4, and all virtual cells on a row where the virtual cell marked with 4 is located have been transferred, a virtual cell marked with 5 on the adjacent row can be used as the new target object. That is, the sequence of numbers marked on the virtual cells in FIG. 2 is the sequence in which the virtual cells are transferred successively.

In this embodiment, the virtual robot can automatically and continuously transfer target objects at different locations, and at the same time transfer target objects on each virtual pallet sequentially from top to bottom according to a stacking order of virtual pallets, so as to achieve orderly transfer of the target objects to shorten the time required to transfer all target objects.

According to some embodiments of the present application, optionally, when there is an empty virtual pallet that does not carry an object, the robot offset simulation method further includes: receiving a pallet transfer instruction sent by the PLC, and controlling the virtual robot to transfer the empty virtual pallet to a target location according to the pallet transfer instruction.

In this embodiment, each time the virtual robot completes the transfer of a target object, the electronic device sends, to the PLC, a signal indicating that the transfer of the target object is completed. The signal may carry the row number, the column number, and the layer number of the transferred target object. The PLC can record the row number, the column number, and the layer number of the transferred target object, so as to determine whether all the objects on the virtual pallet have been transferred, so that when it is determined that all the objects have been transferred, a pallet transfer instruction is sent to the electronic device, so that the electronic device controls the virtual robot to transfer the empty virtual pallet to the target location according to the pallet transfer instruction. The target location can be set according to actual needs, and is used for placing an empty virtual pallet.

In the embodiments, by transferring the empty virtual pallet to the target location, after the empty virtual pallet is transferred, it is convenient for the virtual robot to directly transfer the objects carried by the virtual pallet below the empty virtual pallet.

According to some embodiments of the present application, optionally, before the establishing a reference path of the virtual robot in the simulation software in step 101, the method further includes: importing an XML file in the simulation software; where a robot automatic offset offline program is integrated in the XML file.

The syntax of the XML file conforms to the XML syntax structure, the syntax supported by Tecnomatix Process Simulate software, and the syntax of a corresponding brand robot. In this embodiment, according to the XML syntax structure, instructions such as the algorithm for robot automatic shift and the syntax structure supported by the brand robot can be integrated into XML in advance. The developed XML file is imported into the simulation software, for example, placed under the installation directory of the industrial robot of the corresponding brand of the simulation software, so that the XML file can be loaded after the simulation software is opened, and the XML file can be called when needed. The virtual robot can implement the transfer of the target object according to the robot automatic offset offline program.

In this embodiment, by importing the XML file integrated with the robot automatic offset offline program into the simulation software, it is convenient to automatically and accurately implement the subsequent simulation of the robot shift.

According to some embodiments of the present application, optionally, after the controlling, based on the reference path and the offset, the virtual robot to move, to transfer the target object in step 104, the method further includes: determining whether the virtual robot has successfully transferred N target objects, where N is a natural number greater than 1; in a case that the virtual robot has successfully transferred N target objects, determining that the robot automatic offset offline program has passed verification, and exporting the verified robot automatic offset offline program; and importing the verified robot automatic offset offline program into a real robot.

The determining whether the virtual robot has successfully transferred N target objects can be understood as: It is determined whether the virtual robot accurately shifts to the locations of N target objects along the reference path, and accurately transfers the N target objects to the destination location. Exporting the verified robot automatic offset offline program can be understood as: downloading the verified robot automatic offset offline program to a folder for storage, and then importing the robot automatic offset offline program stored in the folder into the real robot. The folder may be a folder in a computer on which the simulation software is installed.

In some embodiments, before the real robot enters the site to transfer the real target object, the robot automatic offset offline program in the real robot can be tested on site, and can be used normally after the test is correct.

Through the verification of the robot automatic offset offline program, the verified robot automatic offset offline program is imported into the real robot, so that the real robot can directly perform cell transfer in a real scenario based on the verified robot automatic offset offline program, that is, the robot automatic offset offline program exported in the embodiments of the present application can be directly used on site.

The step division of the above methods is merely for clear description. During implementation, the steps may be combined into one step or some steps may be split and decomposed into multiple steps as long as they include the same logical relationship, which all fall within the scope of protection of this patent. Adding irrelevant modifications to the algorithms or processes or introducing irrelevant designs without changing the core design of the algorithms and processes all fall within the scope of protection of the patent.

According to some embodiments of the present application, optionally, the simulation environment involved in the simulation method of robot shift mainly involves the following four parts:

1. XML file, which is a file in XML format customized according to a specific syntax structure. The syntax of the XML file needs to conform to the XML syntax structure, the syntax supported by Tecnomatix Process Simulate software, and the syntax of a corresponding brand robot.
2. The simulation software Tecnomatix Process Simulate, which mainly functions to implement simulation verification and offline programming, referred to as PS for short.
3. Real touch screen and programmable logic controller (PLC) hardware for on-site device control, or virtual touch screen and programmable logic controller software running on the industrial computer.
4. Robot and hardware used for on-site grabbing and placing, welding, gluing, and other processes.

Figure 4:
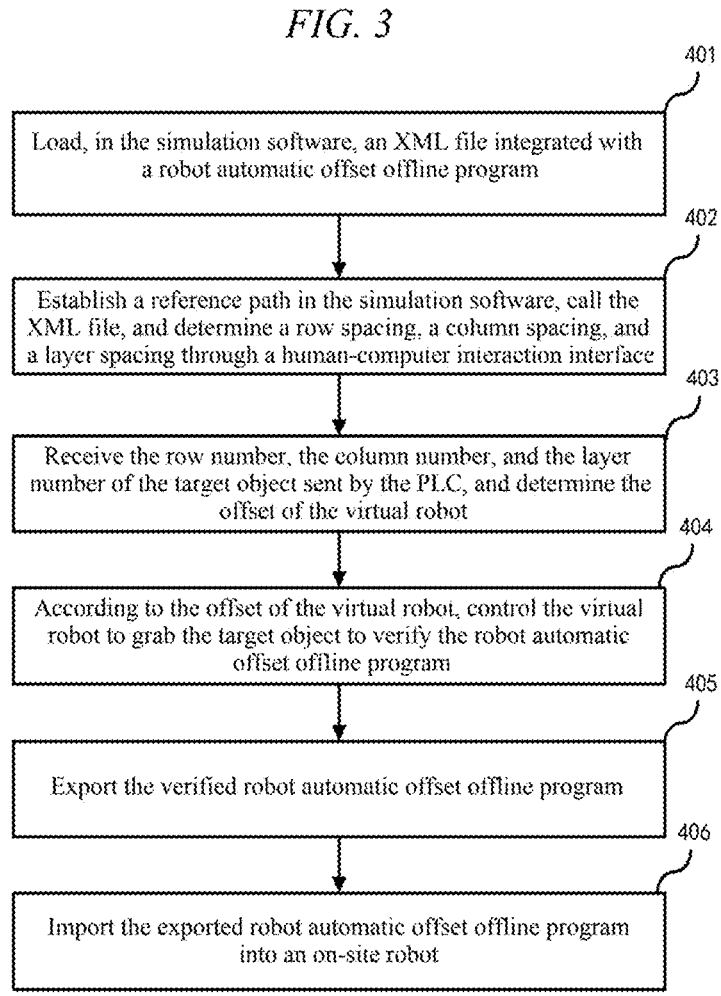
FIG. 4 is a flowchart of another robot offset simulation method according to an embodiment of the present application.

According to some embodiments of the present application, optionally, a flowchart of the robot offset simulation method can be shown in FIG. 4 and includes:

Step 401: Load, in the simulation software, the XML file integrated with the robot automatic offset offline program.

Step 402: Establish a reference path in the simulation software, call the XML file, and determine the row spacing, the column spacing, and the layer spacing through the human-computer interaction interface. For example, after the XML file is called, a parameter input interface pops up in the simulation interface, and the row spacing, the column spacing, and the layer spacing can be input through the parameter input interface.

Step 403: Receive the row number, the column number, and the layer number of the target object sent by the PLC, and determine the offset of the virtual robot.

Step 404: According to the offset of the virtual robot, control the virtual robot to grab the target object to verify the robot automatic offset offline program. For example, the PLC sends the row number, the column number, and the layer number to the virtual robot in the PS, so that the virtual robot executes the grabbing of the target object according to the determined offset.

Step 405: Export the verified robot automatic offset offline program. For example, the verified robot automatic offset offline program is downloaded to a folder for storage. The robot automatic offset offline program is downloaded and stored according to the syntax structure defined in XML.

Step 406: Import the exported robot automatic offset offline program into the on-site robot. If the on-site test is correct, the robot automatic offset offline program can be used normally.

This embodiment solves the problem that the existing simulation software cannot perform the function of automatically shifting the point, and as a result, the simulation engineer needs to repeatedly establish paths to grab different cells. Although there are multiple cells in one pallet, the robot in this embodiment only needs to establish one reference path for grabbing and placing items. By receiving the row number, the column number, and the layer number sent by the PLC, the virtual robot can directly and automatically shift to the corresponding location based on the reference path, to implement the grabbing function of the target object without repeatedly establishing multiple robot grabbing paths, which can reduce the workload of engineers and reduce the debugging cycle. Moreover, the verified robot automatic offset offline program can be downloaded and directly imported into the site for usage without changing the corresponding logic, reducing the debugging cycle.

According to some embodiments of the present application, a robot is provided, and the above-mentioned verified robot automatic offset offline program is imported into the robot.

In this embodiment, the robot that imports the verified robot automatic offset offline program can realize accurate transfer of the target object or the like on site. For example, each cell to be grasped on site may be accurately grabbed, so as to perform the function of grabbing the cell by the robot according to actual needs.

Figure 5:
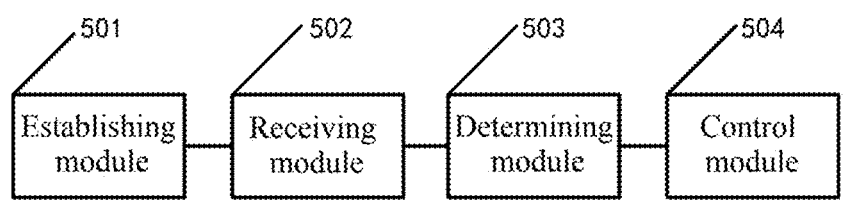
FIG. 5 is a schematic diagram of a robot offset simulation apparatus according to an embodiment of the present application.

According to some embodiments of the present application, a robot offset simulation apparatus is provided. A schematic diagram of the simulation apparatus may be shown in FIG. 5 and includes:

an establishing module 501, configured to establish a reference path for a virtual robot in simulation software; the reference path is a path along which the virtual robot moves to transfer a reference object from a preset starting point to a destination location and then returns to the preset starting point;

a receiving module 502, configured to receive location information of a target object that is sent by a PLC;

a determining module 503, configured to determine an offset of the virtual robot based on the location information; the offset is a location offset of the target object relative to the reference object;

a control module 504, configured to control, based on the reference path and the offset, the virtual robot to move, to transfer the target object.

It is not difficult to find that this embodiment is an apparatus embodiment corresponding to the above-mentioned simulation method embodiment, and this embodiment can be implemented in cooperation with the above-mentioned simulation method embodiment. The relevant technical details mentioned in the above embodiment of the simulation method are still valid in this embodiment, and will not be repeated herein to reduce repetition. Correspondingly, the relevant technical details mentioned in this implementation can also be applied to the above-mentioned simulation method embodiment.

It is worth mentioning that all the modules involved in this embodiment are logical modules. In practical applications, a logical unit can be a physical unit, or a part of a physical unit, or a combination of multiple physical units. In addition, to highlight the innovative part of the present application, units that are not closely related to solving the technical problem proposed by the present application are not introduced in this embodiment, but this does not mean that there are no other units in this embodiment.

Figure 6:
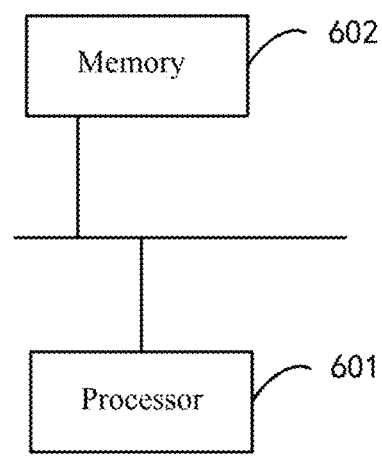
FIG. 6 is a schematic diagram of a structure of an electronic device according to an embodiment of the present application.

According to some embodiments of the present application, an electronic device is provided, as shown in FIG. 6, including: at least one processor 601; and a memory 602 communicatively connected to the at least one processor 601; where the memory 602 stores instructions executable by the at least one processor 601, and when executed by the at least one processor 601, the instructions cause the at least one processor 601 to perform the robot offset simulation method.

The memory 602 and the processor 601 are connected by a bus, the bus may include any number of interconnected buses and bridges, and the bus connects various circuits of one or more processors 601 and the memory 602 together. The bus may further link various other circuits such as a peripheral device, a voltage regulator, and a power management circuit together. These are all well-known in the art, and therefore are not further described in the present specification. The bus interface provides an interface between the bus and a transceiver. The transceiver may be one element or a plurality of elements, for example, a plurality of receivers and a plurality of transmitters, to provide a unit configured to communicate with various other apparatuses on a transmission medium. Data processed by the processor 601 is transmitted on a wireless medium by using an antenna. Further, the antenna further receives data and transmits the data to the processor 601.

The processor 601 is responsible for managing the bus and common processing, and may further provide various functions, including timing, a peripheral interface, voltage regulation, power management, and other control functions. The memory 602 may be configured to store data used when the processor 601 performs an operation.

According to some embodiments of the present application, there is provided a computer-readable storage medium storing a computer program. The above method embodiments are implemented when the computer program is executed by the processor.

That is, those skilled in the art can understand that all or some of the steps in the methods of the above embodiments can be performed by instructing related hardware through a program. The program is stored in a storage medium and includes several instructions to enable a device (which may be a single-chip microcomputer, a chip, or the like) or a processor to perform all or some of the steps of the methods in the embodiments of the present application. The storage medium includes: various mediums that can store program code, such as a universal serial bus (USB) flash drive, a mobile hard disk, a read-only memory (ROM), a random access memory (RAM), a magnetic disk, or an optical disk.

Those of ordinary skill in the art can understand that the above-mentioned implementations are specific embodiments for implementing the present application, and in practical applications, various changes can be made in form and details without departing from the spirit and scope of the present application.

What is claimed is:

1. A robot offset simulation method, comprising:
    establishing a reference path for a virtual robot in simulation software, wherein the reference path is a path along which the virtual robot moves from a preset starting point, to transfer a reference object to a destination location, and then returns to the preset starting point;
    receiving location information of a target object from a programmable logic controller (PLC);
    determining an offset based on the location information of the target object, wherein the offset is a location offset of the target object relative to the reference object; and
    based on the reference path and the offset, controlling the virtual robot to move from the preset starting point to the target object, and transfer the target object to the destination location;
    wherein the location information of the target object comprises a layer number, a row number, and a column number of the target object; and determining the offset based on the location information of the target object comprises:
        determining a row spacing and a column spacing between adjacent objects on a virtual pallet, and determining a layer spacing between adjacent stacked virtual pallets; and
        determining the offset based on the layer number, the row number, the column number of the target object, the row spacing and the column spacing between adjacent objects, and the layer spacing between adjacent stacked virtual pallets;
    wherein based on the reference path and the offset, controlling the virtual robot to move from the preset starting point to the target object, and transfer the target object to the destination location comprises:
        controlling, based on the reference path, the virtual robot to move toward a location of the reference object; and
        when the virtual robot is moving toward the location of the reference object, controlling the virtual robot to shift to a location of the target object based on the offset.

2. The robot offset simulation method according to claim 1, wherein
    the offset comprises an offset in an x-axis direction, an offset in a y-axis direction, and an offset in a z-axis direction; and
    determining the offset based on the layer number, the row number, the column number of the target object, the row spacing and the column spacing between adjacent objects, and the layer spacing between adjacent stacked virtual pallets comprises:
        calculating the offset in the x-axis direction based on the column number of the target object, a column number of the reference object, and the column spacing;
        calculating the offset in the y-axis direction based on the row number of the target object, a row number of the reference object, and the row spacing; and
        calculating the offset in the z-axis direction based on the layer number of the target object, a layer number of the reference object, and the layer spacing.

3. The robot offset simulation method according to claim 1, wherein determining the row spacing and the column spacing between adjacent objects on the virtual pallet, and determining the layer spacing between adjacent stacked virtual pallets comprises:
    receiving information of the row spacing and the column spacing between adjacent objects on the virtual pallet and the layer spacing between adjacent stacked virtual pallets from an input through a human-computer interaction interface.

4. The robot offset simulation method according to claim 1, wherein after controlling, based on the reference path and the offset, the virtual robot to move to from the preset starting point to the target object, and transfer the target object to the destination location the method further comprises:
  feeding back, to the PLC, a signal indicating that the transfer of the target object is completed; and
  receiving location information of a new target object that is sent by the PLC;
  determining a new offset based on the location information of the new target object; and
  continuing to control the virtual robot to move to the new object based on the new offset, and transfer the new target object to the destination location.

5. The robot offset simulation method according to claim 4, wherein when there is an object that has not been transferred on a reference virtual pallet carrying the reference object, the new target object is the object that has not been transferred; or
  when there is an empty virtual pallet that does not carry any object, the new target object is an object carried on a virtual pallet located below the empty virtual pallet.

6. The robot offset simulation method according to claim 5, wherein when there is an empty virtual pallet that does not carry any object, the method further comprises:
  receiving a pallet transfer instruction sent by the PLC, and controlling, according to the pallet transfer instruction, the virtual robot to transfer the empty virtual pallet to a target location.

7. The robot offset simulation method according to claim 1, wherein before establishing the reference path for the virtual robot in simulation software, the method further comprises:
  importing an extensible markup language (XML) file into the simulation software, wherein a robot automatic offset offline program is integrated in the XML file.

8. The robot offset simulation method according to claim 7, wherein after based on the reference path and the offset, controlling the virtual robot to move from the preset starting point to the target object, and transfer the target object to the destination location, the method further comprises:
  determining whether the virtual robot has successfully transferred N target objects, wherein N is a natural number greater than 1;
  based on a determination that the virtual robot has successfully transferred N target objects, determining that the robot automatic offset offline program has passed verification; and
  importing the verified robot automatic offset offline program into a real robot.

9. A robot, wherein the verified robot automatic offset offline program according to claim 7 is imported into the robot.

10. An electronic device, comprising:
  at least one processor; and
  a memory communicatively connected to the at least one processor; wherein the memory stores instructions executable by the at least one processor, and the instructions, when executed by the at least one processor, cause the at least one processor to perform a robot offset simulation method that comprises:
  establishing a reference path for a virtual robot in simulation software, wherein the reference path is a path along which the virtual robot moves from a preset starting point, to transfer a reference object to a destination location, and then returns to the preset starting point;
  receiving location information of a target object from a programmable logic controller (PLC);
  determining an offset based on the location information of the target object, wherein the offset is a location offset of the target object relative to the reference object; and
  based on the reference path and the offset, controlling the virtual robot to move from the preset starting point to the target object, and transfer the target object to the destination location:
  wherein the location information of the target object comprises a layer number a row number, and a column number of the target object; and determining the offset based on the location information of the target object comprises:
    determining a row spacing and a column spacing between adjacent objects on a virtual pallet, and determining a layer spacing between adjacent stacked virtual pallets; and
    determining the offset based on the layer number, the row number, the column number of the target object, the row spacing and the column spacing between adjacent objects, and the layer spacing between adjacent stacked virtual pallets:
  wherein based on the reference path and the offset, controlling the virtual robot to move from the preset starting point to the target object, and transfer the target object to the destination location comprises:
    controlling, based on the reference path, the virtual robot to move toward a location of the reference object; and
    when the virtual robot is moving toward the location of the reference object, controlling the virtual robot to shift to a location of the target object based on the offset.

11. A non-transitory computer-readable storage medium storing a computer program, wherein the computer program, when executed by a processor, implements a robot offset simulation method that comprises:
  establishing a reference path for a virtual robot in simulation software, wherein the reference path is a path along which the virtual robot moves to from a preset starting point, to transfer a reference object to a destination location, and then returns to the preset starting point;
  receiving location information of a target object from a programmable logic controller (PLC);
  determining an offset based on the location information of the target object, wherein the offset is a location offset of the target object relative to the reference object; and
  based on the reference path and the offset, controlling the virtual robot to move from the preset starting point to the target object, and transfer the target object to the destination location:
  wherein the location information of the target object comprises a layer number, a row number, and a column number of the target object; and determining the offset based on the location information of the target object comprises:
    determining a row spacing and a column spacing between adjacent objects on a virtual pallet, and determining a layer spacing between adjacent stacked virtual pallets; and
    determining the offset based on the layer number the row number the column number of the target object, the row spacing and the column spacing between adjacent objects, and the layer spacing between adjacent stacked virtual pallets:
  wherein based on the reference path and the offset, controlling the virtual robot to move from the preset starting point to the target object, and transfer the target object to the destination location comprises:

controlling, based on the reference path, the virtual robot to move toward a location of the reference object; and when the virtual robot is moving toward the location of the reference object controlling the virtual robot to shift to a location of the target object based on the offset.

\* \* \* \* \*